United States Patent [19]

Smith

[11] Patent Number: 4,688,909

[45] Date of Patent: Aug. 25, 1987

[54] THERMALLY COMPENSATING POSITIONING DEVICES AND ASSEMBLIES

[76] Inventor: Richard E. Smith, 6416 Riverland Dr., Ft. Pierce, Fla. 33450

[21] Appl. No.: 732,283

[22] Filed: May 9, 1985

[51] Int. Cl.$^4$ .............................. G02B 7/18; G02B 5/08
[52] U.S. Cl. ................................ 350/631; 248/218.4; 248/219.1; 248/475.1; 248/476; 248/DIG. 1; 350/253; 350/616; 350/632; 350/639
[58] Field of Search ............... 350/253, 616, 639, 631, 350/632; 248/466, 476, 475.1, DIG. 1, 207, 218.4–219.4, 477

[56] References Cited

U.S. PATENT DOCUMENTS

| | | | |
|---|---|---|---|
| 2,273,604 | 2/1942 | Vetter | 350/616 X |
| 2,533,478 | 12/1950 | Lee et al. | 350/253 |
| 2,537,900 | 1/1951 | Lee et al. | 350/253 |
| 2,569,622 | 10/1951 | Trainor | 248/477 |
| 3,484,718 | 12/1969 | Foster | 350/253 X |
| 3,916,944 | 11/1975 | Crawford et al. | 248/DIG. 1 X |
| 4,116,537 | 9/1978 | Dilworth | 350/253 |
| 4,157,802 | 6/1979 | May, Jr. | 350/631 X |
| 4,162,120 | 7/1979 | Moreno | 350/253 |
| 4,190,325 | 2/1980 | Moreno | 350/253 |
| 4,282,688 | 8/1981 | Krim | 350/253 X |

Primary Examiner—John Petrakes
Attorney, Agent, or Firm—Carroll F. Palmer

[57] ABSTRACT

A thermally compensating positioning device for use in maintaining an object, e.g., an optical mirror, in a precisely fixed position throughout ambient temperature fluctuations comprises an elongated first columnar member, e.g., a bar, and an elongated second columnar member, e.g., another bar, formed of material that has a coefficient of thermal expansion higher than that of the first columnar member. The first and second members are connected together in a manner that the second member is restrained against movement by the first member along its longitudinal axis and the second member is structured to flex away from or toward the first member when the ambient temperature rises above or falls below a datum temperature.

In a preferred embodiment, lugs integral with the ends of the second member connect it in yoke manner to the ends of the first member and the second member has a slot in its midsection to provide for midsection flexing with temperature variations.

In thermally compensated assemblies comprising the new positioning devices, a longitudinal side of one of the members (bars) contacts the mirror or other object to assist in maintaining such object in a fixed precise position. The new positioning devices function by expanding or contracting laterally at a rate several time greater than the housing or other support in or upon which the object is mounted so the devices can keep a controlled gap between the object and such housing as the housing expands or contracts with temperature change.

12 Claims, 14 Drawing Figures

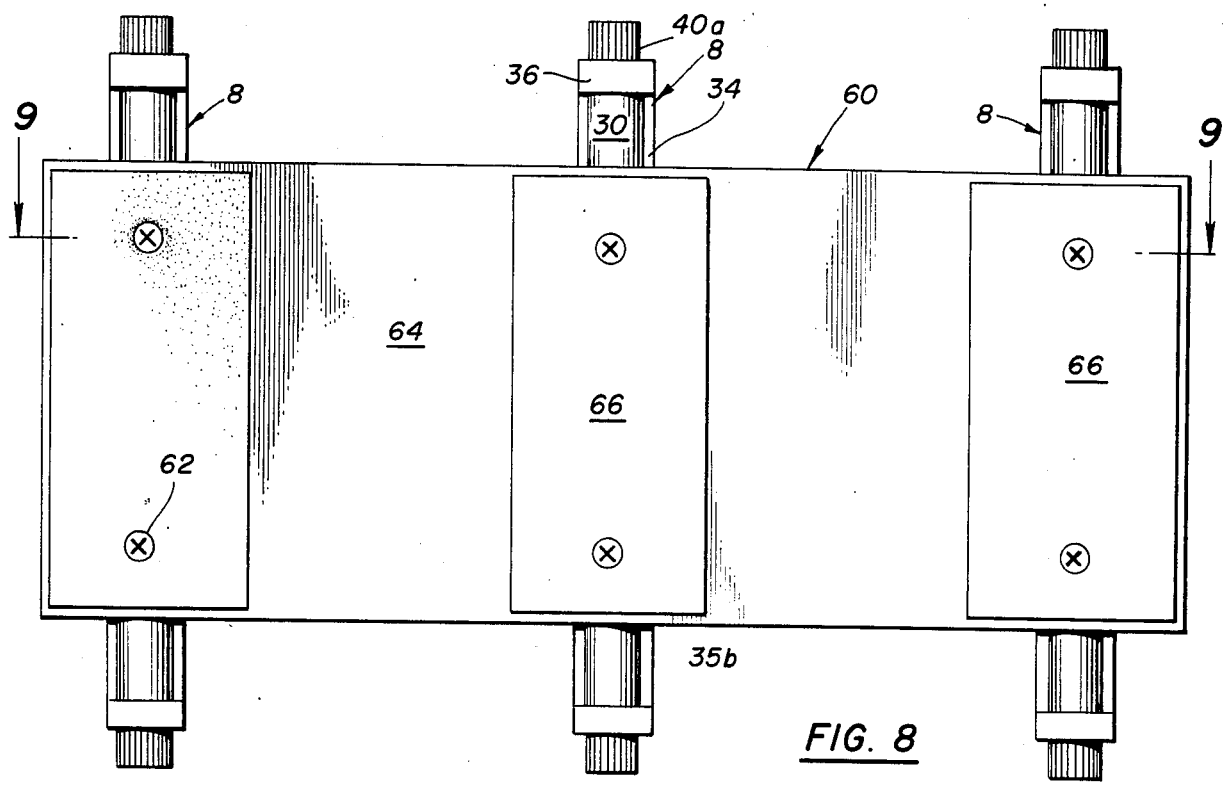
FIG. 8
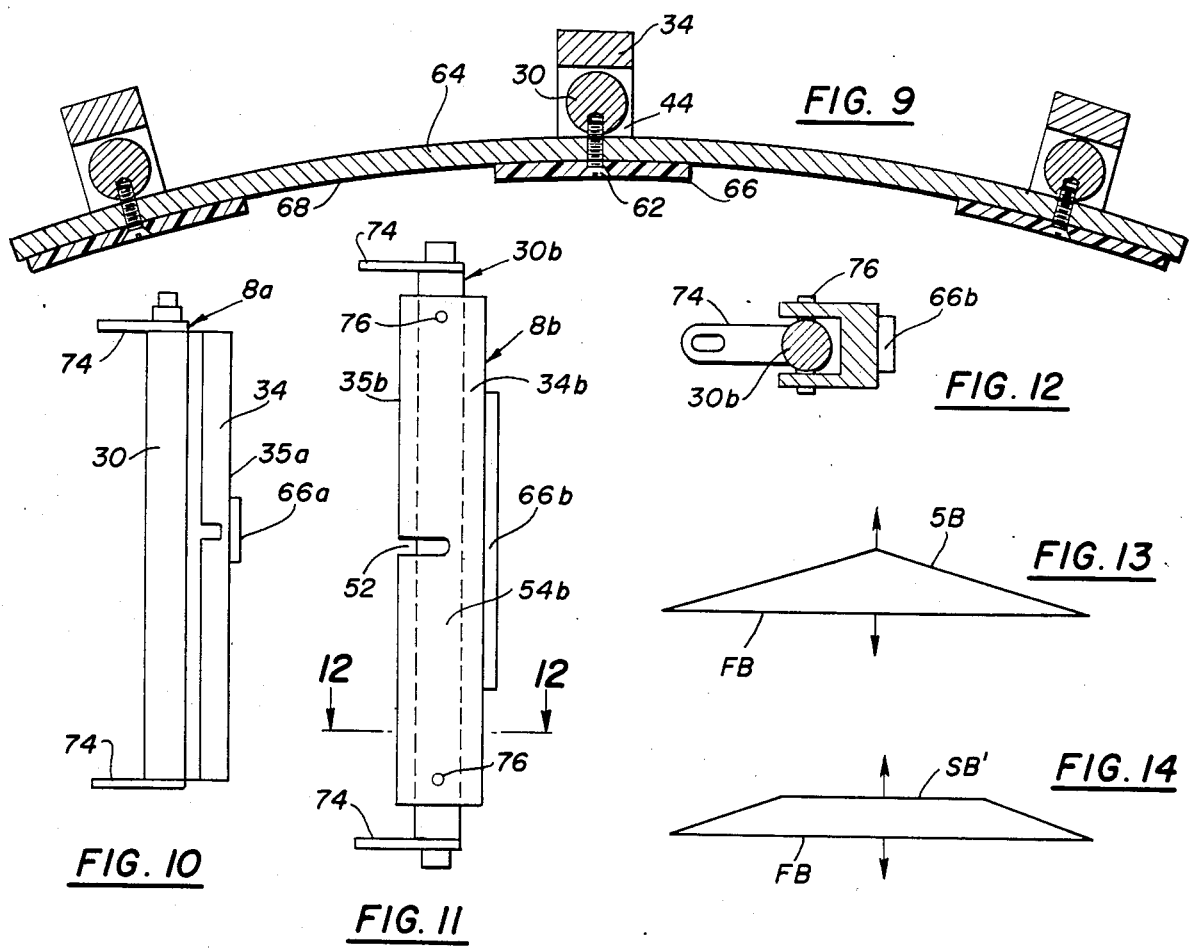
FIG. 9
FIG. 10
FIG. 11
FIG. 12
FIG. 13
FIG. 14

THERMALLY COMPENSATING POSITIONING DEVICES AND ASSEMBLIES

BACKGROUND OF THE INVENTION

1. Field of the Invention

This invention relates to thermally compensating positioning devices for use in maintaining an object in a precisely fixed position throughout ambient temperature fluctuations. In particular, it concerns positioning units that enable optical mirrors or other objects requiring precise positioning regardless of ambient temperature fluctuations to be operatively mounted on support structures that undergo dimensional change with temperature changes.

2. Description of the Prior Art

The need to provide, in some fashion, compensation for differences in thermal expansion between parts in structures is universal. In many instances, minimal precision of such compensation is required, e.g., expansion joints between sections roadways. In other cases, however, greater compensation precision is required.

One type of structure that requires high precision in thermal compensation for thermal expansion between parts is optical devices such as optical telescopes and other optical instruments. While such need exists for terrestrial devices, the requirements and demands on thermal compensation become exaggerated in connection with devices designed for extra-terrestrial use because of the extreme temperature variations that will be encountered by such devices, e.g., between 0° and 600° K. and, particularly, between −130° and 200° C.

One approach towards mitigating the problem of temperature expansion differentials of parts in structures, including optical devices, has been to use materials having substantially zero coefficient of thermal expansion for construction of parts, e.g., "Invar" metal. For example, U.S. Pat. No. 4,157,802 discloses the use of such material in conjunction with a rigid, thermally sensitive base to provide support for optical elements that must be held immobile through a range of ambient temperatures.

The use of zero or nearly zero coefficient materials to avoid parts movements due to temperature changes in optical or other devices is disclosed in a variety of other prior U.S. Pats. Nos. including:

2,533,478, 3,484,718,
2,537,900, 4,282,688.

The present invention provides further improvements in the art of thermal parts differential compensation making possible the positioning of objects, e.g., optical mirrors, throughout wide temperature ranges with a precision of the order of an Angstrom unit.

OBJECTS

A principal object of the invention is the provision of new, improved thermally compensating positioning devices for use in maintaining an object in a precisely fixed postion throughout ambient temperature fluctuations.

Further objects include the provision of:

1. Assemblies containing objects, e.g., an optical mirror, mounted in a housing or other support structure that is not dimensionally stable with variations in ambient temperatures wherein the object is maintained in a precise datum position throughout the range of ambient temperatures to be encountered by the assembly.

2. New thermal compensation devices of relatively simple construction, but capable of providing dimensional positioning to structural elements of high precision.

3. New thermally compensated optical mirror assemblies.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The foregoing objects are accomplished, in part, in accordance with the invention by the provision of a thermally compensating positioning device for use in maintaining an object in a precisely fixed position throughout ambient temperature fluctuations comprising an elongated first columnar member, e.g., a bar, formed of material having a first coefficient of thermal expansion and an elongated second columnar member, e.g., a second bar, formed of material having a second coefficient of thermal expansion higher than the first coefficient in the range of the fluctuation temperatures.

The new positioning device further includes means connecting the first member to the second member to restrain movement of the second member along its longitudinal axis, means to cause the second member to flex away from the first member when the ambient temperature rises above datum, and means to contact a longitudinal side of one of the members with the positioned object to assist in maintaining the object in the required fixed position.

In preferred embodiments of the invention, the first and second members are elongated first and second bars with the second bar forming a portion of a yoke that includes a first lateral lug connected to and extending normally of the second bar, the free end thereof being fastened to one end of the first bar, a second lateral lug connected to and extending normally of the second bar, the free end thereof being fastened to the other end of the first bar. Additionally, there is means to cause the second bar to flex in its midsection away from the first bar when the ambient temperature rises above datum.

The objects are further accomplished by the invention by the provision of optical mirror assembly wherein the optical positioning of the mirror does not appreciably vary with fluctuations in ambient temperature comprising an optical mirror, a housing structure supporting the mirror, and a positioning unit maintaining the mirror precisely positioned by the housing structure throughout ambient temperature fluctuations to which the assembly may be subjected, the positioning unit including a multiplicity of compensator devices engaging the periphery of the mirror.

Each of the compensator devices comprises an elongated first columnar member formed of material having a first coefficient of thermal expansion, and an elongated second columnar member formed of material having a second coefficient of thermal expansion higher than the first coefficient in the range of the fluctuation temperatures. The ends of the first member are connected to the second member to restrain movement of the second member along its longitudinal axis and the second member is structured to flex away from the first member when the ambient temperature rises above a datum temperature.

In addition, bearing means extends laterally of each of the compensator devices by which the mirror is contacted for precise positioning, and there are mounting means contacting the positioning unit with the housing structure.

BRIEF DESCRIPTION OF THE DRAWINGS

A more complete understanding of the invention may be had by reference to the accompanying drawings in which:

FIG. 8 is plan view of one embodiment of an object positioning unit of the invention.

FIG. 9 is a sectional view taken on the line 9—9 of FIG. 8.

FIG. 10 is a side view of a second embodiment of a thermally compensating positioning device of the invention.

FIG. 11 is a side view of a third embodiment of a thermally compensating positioning device of the invention.

FIG. 12 is a sectional view taken on the line 12—12 of FIG. 11.

FIG. 13 is a diagram of the functioning of one embodiment of a thermally compensating positioning device of the invention.

FIG. 14 is a diamgram of the functioning of another embodiment of a thermally compensating positioning device of the invention.

DESCRIPTION OF THE PREFERRED EMBODIMENTS

Figure 1:
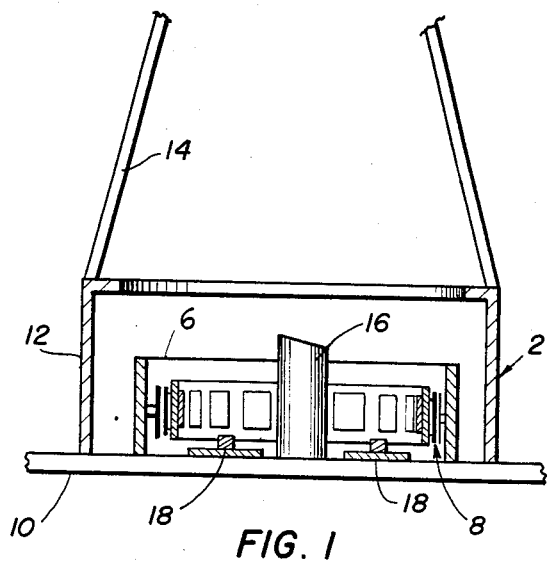
FIG. 1 is fragmentary, sectional, lateral view of an optical mirror assembly provided with thermally cmpensating positioning devices of the invention. The mirror is not shown in FIG. 1 for the purposes of illustation of other parts.
Figure 2:
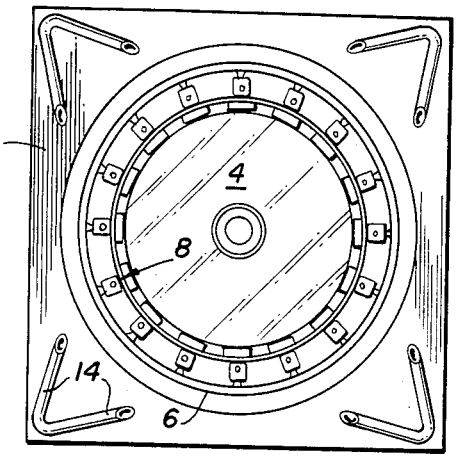
FIG. 2 is a sectional view taken on the line 2—2 of FIG. 1 with the mirror, not shown in FIG. 1, in place.
Figure 6:
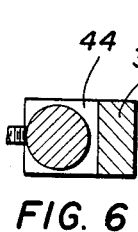
FIG. 6 is a sectional view taken on the line 6—6 of FIG. 5.
Figure 7:
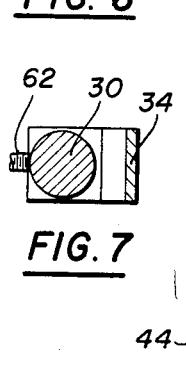
FIG. 7 is a sectional view taken on the line 7—7 of FIG. 5.
Figures 4, 5:
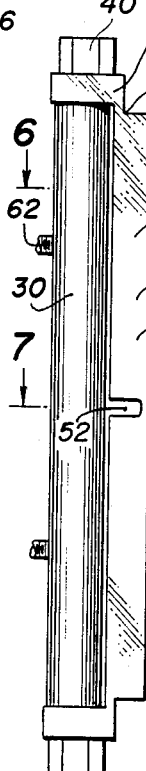
FIG. 4 is an end view of a first embodiment of a thermally compensating positioning device of the invention.
FIG. 5 is a side view of the device of FIG. 4.

Referring in detail to the drawings, in which identical parts are identically marked, the invention broadly concerns assemblies 2 comprising objects, i.e., optical mirrors 4, maintained in precise position in housing 6 by thermally compensating positioning devices 8.

The assembly 2 in a preferred embodiment of the invention is a precision reflective telescope including a base plate 10, enclosure 12 for housing (cell) 6, reflector supports 14, angled relay element 16 and adjustable supports 18 for contact with the back 20 of the mirror 4.

The devices 8 comprise an elongated first bar 30 formed of material having a first coefficient of thermal expansion and a yoke 32 defined by:

i. an elongated second bar 34 formed of material having a second coefficient of thermal expansion higher than the coefficient of the bar 30 and having an exposed longitudinal surface 35a plus an opposite surface 35b.

ii. a first lateral lug 36 connected to second bar 34 by integral web 38 and fastened by bolt 40 to the top end 42 of first bar 30, iii. a second lateral lug 44 connected to second bar 34 by integral web 46 and fastened by bolt 48 to bottom end 50 of first bar 30, and iv. slot 52 through surface 35b of bar 34 that serves as means to cause second bar 34 to flex in its midsection 52 relative to first bar 30 when the ambient temperature varies from the datum temperature.

The devices 8 may be used individually to provide compensation for differentials in thermal expansion between separate parts of an assembly of parts. Alternatively, as illustrated by FIGS. 8 and 9, they may be ganged to perform that function. Thus, in the positioning unit 60, three devices 8 are fastened spaced apart by machine screws 62 to an arcuate plate 64. The fasteners 62 also hold the bearing members 66 against the inner face 68 of the plate. A number of such positioning units 60 can be used around the periphery of an object, such as mirror 4, to maintain it in precise position in the assembly 2.

Figure 3:
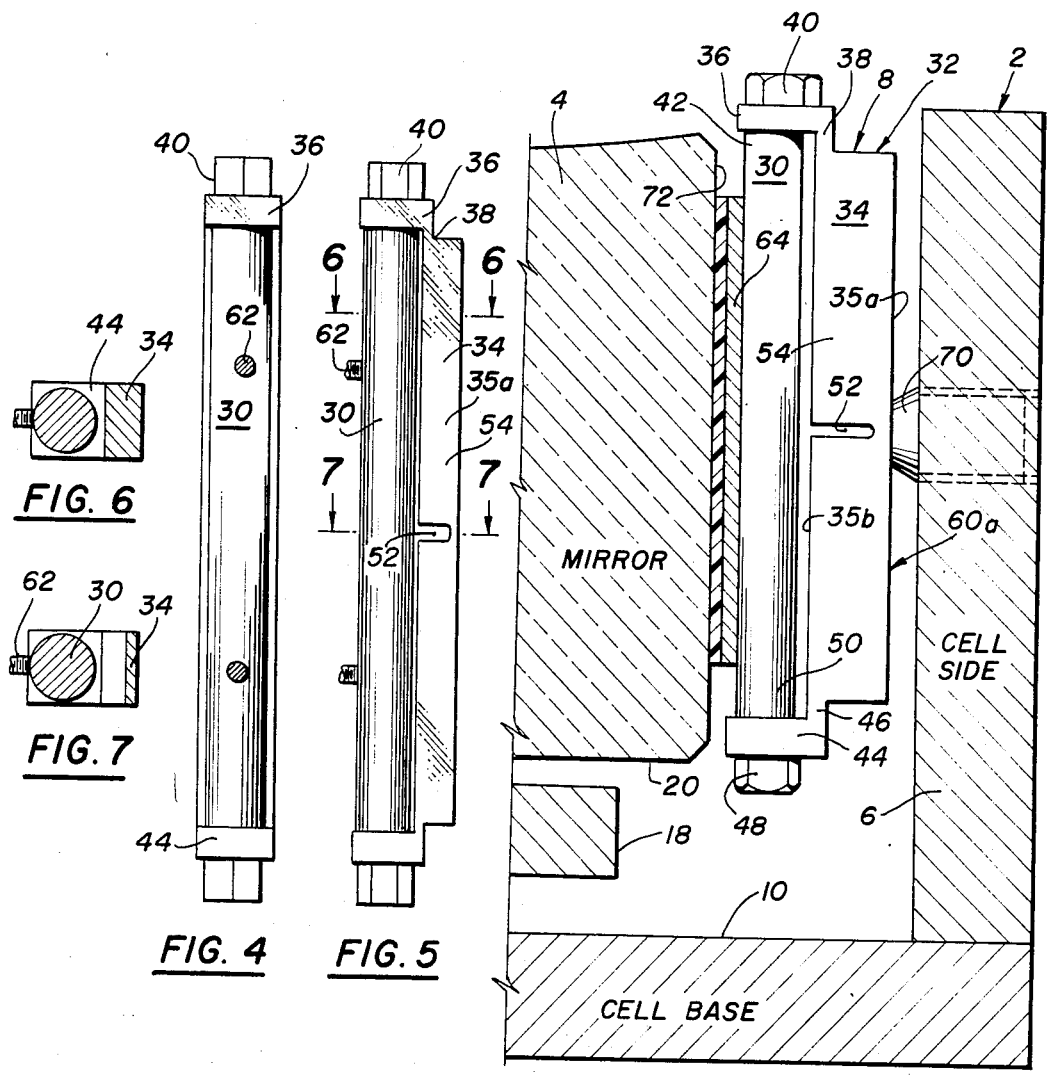
FIG. 3 is an enlarged, fragmentary, partially sectional view of a portion of the mirror assembly of FIG. 1.

In FIGS. 8 and 9, the hex head bolts 40 shown in FIG. 3 are replaced with knurled, Allen-wrench headed bolts 40a.

FIG. 3 illustrates a preferred arrangement for the positioning of the optical mirror 4 in an assembly 2 using the new devices 8 ganged in a positioning unit 60a. Thus, the surface 35a of each bar 34 in the unit 60a is contacted and compressed by a set screw 70 that is threaded into the cell side 6. In turn, the bearing members 66 contact the periphery 72 of the mirror 4 so that the unit 60a is compressed by the action of the set screws 70 between the cell side 6 and the mirror 4.

Another arrangement for utilization of the new positioning devices in shown in FIG. 10. Here, the device 8a comprises lateral lugs 74 fastened to the ends of the bar 30 and the bar 34 has a bearing member 66a in the form of a pad of plastic material fastened to the surface 35a of bar 34. In the use of this embodiment, the device 8a would be arranged with the lugs 74 fastened to one part (not shown) of an assembly (not shown) while the bearing member 66a would contact a portion of an object (not shown) to assist in precise positioning of such object.

A further embodiment of the positioning devices of the invention is shown in FIG. 11. The device 8b comprises a first bar 30b and a second bar 34b having thermal expansion properties comparable to those of the previously described embodiments. The bar 34b, which is of channel cross section rather than being solid, is connected at its ends by pins 76 to the end portions of the bar 30b and there is a slot 52 though its longitudinal side 35b so that as the bar 34b expands or contracts faster than bar 30b with ambient temperature changes, bar 34b is placed under compression or tension and will flex in its midsection 54b. The device also includes lugs 74 and bearing means 66b for its incorporation in thermally compensated assemblies as described with regard to FIG. 10.

FIG. 13 is a force diagram indicating what force vectors occur in the devices of the invention such as shown in FIGS. 3-11 as the temperature ambient thereto increases above the datum. In the figure, the angled lines SB represent the second bar, e.g., bar 34, and the single base line FB represents the first bar, e.g., bar 30. As the temperature increases above datum, SB elongates faster than FB, but since FB is constrained against elongation by FB, it is placed under compression. The slot 52, together with the connection webs 38, in bar 34 act as flex point. Hence, FB flexes outwardly from FB and the device comprising SB and FB exert lateral forces at their midsections as indicated by the arrows in FIG. 13. Thus, in the embodiments of FIGs. 3–11, the new devices are predicated on the base of a triangle being made of high expansion material while the hypotenuse is made of high expansion material. Thus, when the temperature changes, the height of the triangle increases or decreases at an amplified rate of a triangle made of a single material.

By way of example, the lower expansion material for bar 30 etc. can be "Invar", nickel alloys, silicon carbide or other material of near zero coefficient of thermal expansion while the high expansion material for bar 34 etc. can be aluminum and its alloys, magnesium and its alloys, brass, copper or other material of relatively high coefficient of thermal expansion. Plastics, ceramics or other material may be used in place of or in combination with metals.

Although the invention has been described with special reference to the use of a single slot in the midsection of the second bar as means to cause flexing thereof relative to the first bar with changes of temperature above or below datum, other means for this can be used, e.g., a plurality of slots, a tapering of the second bar from a thick midsection to thin ends, or equivalent arrangements. In this connection, FIG. 14 is a force diagram, similar to FIG. 13, of a device of the invention having two, rather than one, slot in the second bar. In such case, a force trapazoid would result from the first bar represented by FB and the bi-slotted, second bar represented by SB'. Other arrangements not specifically illustrated are possible as will be recognized by those skilled in the from this disclosure.

A prime function of the new devices, e.g., device 8, or the positioning units, e.g., unit 60, is to expand or contract at a rate several times greater than the object and associated parts in an assembly comprising same. By doing this, they can keep a "zero" gap between the object and associated parts, e.g., between the otpical mirror and the support housing, as the assembly expands or contracts with temperature changes. For example, in the case of an optical mirrored telescope without such compensation, the housing would need to fit loose around the mirror or risk having the mirror squeezed out of figure when the temperature drops. If the mirror/ housing fit is loose, the primary mirror will decenter with respect to the secondary mirror or other optical components and produce a poor quality image.

The invention provides thermal compensation devices which make possible the construction of optical telescopes that can operate under extreme swings of ambient conditions including those encountred, for example, with such an instrument launched from earth into space, which instruments maintain critical parts in precise positions required for proper functioning of them for their intended purposes.

Although the invention has be described with particular reference to optical mirrors and telescopes, the new devices and units can find utility in numerous assemblies requiring precise positioning of parts relative to one another.

The embodiments of the invention in which an exclusive property or privilege is claimed are defined as follows:

1. A thermally compensating positioning device for use in maintaining an object in a precisely fixed position throughout ambient temperature fluctuations which comprises:
    an elongated first bar formed of material having a first coefficient of thermal expansion,
    a yoke formed of material having a second coefficient of thermal expansion higher than said first coefficient in the range of said fluctuation temperatures, said yoke including:
    an elongated second bar,
    a first lateral lug connected to and extending normally of said second bar, the free end thereof being fastened to one end of said first bar,
    a second lateral lug connected to and extending normally of said second bar, the free end thereof being fastened to the other end of said first bar, and
    means to cause said second bar to flex in its middle region away from said first bar when said ambient temperature rises above datum.

2. A thermally compensating positioning device for use in maintaining an object in a precisely fixed position throughout ambient temperature fluctuations which comprises:
    an elongated first bar formed of metal having a first coefficient of thermal expansion,
    a yoke formed of metal having a second coefficient of thermal expansion higher than said first coefficient in the range of said fluctuation temperatures, said yoke comprising:
    an elongated second bar,
    an integral first lateral lug extending normally of said second bar, the free end thereof being fastened to one end of said first bar,
    an integral second lateral lug extending normally of said second bar, the free end thereof being fastened to the other end of said first bar,
    a slot in the midsection of said second bar extending normal to its longitudinal axis and part way therein to cause said second bar to flex away from said first bar when said ambient temperature rises above datum, and
    bearing means extending laterally of one of said bars by which an object may be contacted to be maintained in a precise position.

3. As assembly comprising the positioning device of claim 2 wherein said object is an optical mirror.

4. The device of claim 2 wherein said first bar is circular in lateral cross-section, said second bar is rectangular in lateral cross-section and said lateral lugs are integral with said second bar.

5. The device of claim 4 wherein said bearing means is a pad fastened to a longitudinal side of said first bar for frictional engagement with said object which is an optical mirror.

6. The device of claim 2 wherein said first coefficient of expansion is substantially zero in range of said temperature fluctuations.

7. An optical mirror assembly wherein the optical positioning of said mirror does not appreciably vary with fluctuations in ambient temperatures comprising:
    an optical mirror,
    a housing structure supporting said mirror, and
    a positioning unit maintaining said mirror precisely positioned by said housing structure throughout ambient temperature fluctuations to which said assembly may be subjected, said positioning unit including a multiplicity of compensator devices engaging the periphery of said mirror, each said device comprising:

an elongated first columnar member formed of material having a first coefficient of thermal expansion, an elongated second columnar member formed of material having a second coefficient of thermal expansion higher than said first coefficient in the range of said fluctuation temperatures, the ends of said first member being connected to said second member to restrain movement of said second member along its longitudinal axis, the second member being structured to flex away from said first member when the ambient temperature rises above a datum temperature, bearing means extending laterally of each of said devices by which said mirror is contacted for precise positioning, and mounting means contacting said positioning unit with said housing structure.

8. An optical mirror assembly wherein the optical positioning of said mirror does not appreciably vary with fluctuations in ambient temperature comprising:

an optical mirror and a positioning unit maintaining said mirror precisely positioned throughout ambient temperature fluctuations to which said assembly may be subjected, said positioning unit including a multiplicity of compensator devices engaging the periphery of said mirror, each said device comprising:

an elongated first bar formed of material having a first coefficient of thermal expansion, a yoke formed of material having a second coefficient of thermal expansion higher than said first coefficient in the range of said fluctuation temperatures, said yoke comprising:

an elongated second bar, a first lateral lug connected to and extending normally of said second bar, the free end thereof being fastened to one end of said first bar, a second lateral lug connected to and extending normally of said second bar, the free and thereof being fastened to the other end of said first bar, a slot in said second bar to cause it to flex in its midsection away from said first bar when said ambient temperature rises above datum, and bearing means extending laterally of each of said devices by which the periphery of said mirror is contacted for precise positioning.

9. The assembly of claim 8 wherein each said bearing means is a pad fastened to a longitudinal side of each said first bars for frictional engagement with said optical mirror.

10. The assembly of claim 8 wherein each said bearing means is a pad fastened to a longitudinal side of each said bars for frictional engagement with said optical mirror.

11. The assembly of claim 8 including means to assist in supporting said mirror by contact with the mirror's back.

12. A thermally compensating positioning device for use in maintaining an object in a precisely fixed position throughout ambient temperature fluctuations which comprises:

an elongated first columnar member formed of material having a first coefficient of thermal expansion, an elongated second columnar member formed of material having a second coefficient of thermal expansion higher than said first coefficient in the range of said fluctuation temperatures, means connecting said first columnar member to said second columnar member to restrain movement of said second columnar member along its longitudinal axis, means to cause said second columnar member to flex away from said first columnar member when said ambient temperature rises above datum, and means to contact a longitudinal side of one of said members with said object to assist in maintaining said object in said fixed position.

* * * * *